United States Patent [19]

Seed et al.

[11] 4,294,661
[45] Oct. 13, 1981

[54] LIQUID METAL COOLED FAST BREEDER NUCLEAR REACTOR CONSTRUCTIONS

[75] Inventors: Geoffrey Seed, St. Helens; Graham Chesworth, Lymm; John R. Hind, Warrington; Donald Hodgson, Ormskirk, all of England

[73] Assignee: Nuclear Power Company Limited, England

[21] Appl. No.: 26,819

[22] Filed: Apr. 4, 1979

[51] Int. Cl.³ .............................................. G21C 13/00
[52] U.S. Cl. .................................................... 376/363
[58] Field of Search ..................... 176/40, 65, 38, 87

[56] References Cited

U.S. PATENT DOCUMENTS 3,962,032  6/1976  Berniolles et al. ............... 176/65
4,172,010 10/1979  Seed et al. ...................... 176/65
4,172,011 10/1979  Seed et al. ...................... 176/40

FOREIGN PATENT DOCUMENTS 1412949 11/1975  United Kingdom ............... 176/87

Primary Examiner—Harvey E. Behrend
Attorney, Agent, or Firm—Larson and Taylor

[57] ABSTRACT

In a nuclear reactor of the pool kind the primary vessel and fuel assembly are carried from the roof of the containment vault by tie straps. The primary vessel incorporates an annular yoke of 'K' cross-section the tie straps being attached to the upwardly directed vertical leg and the downwardly directed inclined leg. The upper and lower strakes of the primary vessel are extensions of the remaining legs. Load supporting welds therefore are of intermittent nature thereby limiting the effects of weld crack propagation.

6 Claims, 3 Drawing Figures

LIQUID METAL COOLED FAST BREEDER NUCLEAR REACTOR CONSTRUCTIONS

BACKGROUND OF THE INVENTION

This invention relates to liquid metal cooled fast breeder nuclear reactor constructions of the pool kind.

A liquid metal cooled fast breeder nuclear reactor construction of the pool kind comprises a nuclear fuel assembly submerged in a pool of liquid metal coolant in a primary vessel which is suspended from the roof structure of a containment vault. Liquid metal cooled fast breeder nuclear reactors of the pool kind already in existence are of relatively small size, for example, the construction known as the Prototype Fast Reactor (PFR) situated at Dounreay in Scotland which generates 600 MW(t) of power. The fuel assembly in the PFR is carried from the roof structure by a series of ties but in some proposed new construction designs the fuel assemblies are carried from the wall of the primary vessel. Our co-pending U.S. Application Ser. No. 824235, now Pat. No. 4,172,010, by G. Seed, D. Hodgson and C. J. Grime for a 1300 MW(t) reactor, discloses a typical construction of this kind, the fuel assembly being carried on a strongback from the wall of the primary vessel by a skirt. The primary vessel and strongback, which would be manufactured in austenitic stainless steel, are subjected to deadweight loadings arising, in the case of the primary vessel, from the weight of the pool of coolant and the fuel assembly, and in the case of the strongback, arising from the weight of the fuel assembly. The primary vessel and strongback are also subject to pressure loadings and temperature gradients. In addition, weldments in these structures are also subjected to in-built stresses arising from the welding process. Because of the variations in fracture toughness properties of austenitic metal arising from temperature and irradiation effects, it has been postulated that small defects in weldments could give rise to fast crack propagation leading to catastrophic failure of components. The size and the rate of growth of such defects suggests that the integrity of austenitic stainless steel structures cannot be adequately assured by the more conventional means of detecting the onset of failure by periodic inspection. It is considered therefore that an alternative design philosophy should be adopted in which structures forming part of the main load line between the fuel assembly and the roof structure are at least tolerant to some degree of damage. This philosophy forms the basis of this invention.

SUMMARY OF THE INVENTION

According to the present invention, in a liquid metal-cooled fast breeder nuclear reactor construction of the pool kind, the primary vessel incorporates an annular yoke fabricated from arccuate segments, the yoke being suspended from the roof structure of the vault by a first annular series of tie straps disposed outside the primary vessel whilst a strongback on which the fuel assembly sits inside the primary vessel is supported from the yoke by a second series of tie straps, the yoke having upwardly and downwardly extending legs which are extended by upper and lower strakes respectively of the primary vessel. The invention is based on a damage tolerant design philosophy in that the attachments of the straps provide that the weldments in the main load line between the roof structure of the containment vault and the primary vessel and strongback are of an intermittent nature so that in the event of a weld crack developing damage is restricted to one tie strap. The straps can be continuously load monitored and the failure of a strap readily detected. Although it is unlikely that two or more straps would be damaged by weld cracking simultaneously, the design safety factor could be arranged such that weld crack damage to several straps could be tolerated before the situation became critical.

In a preferred construction the arcuate segments of the yoke are forgings or extrusions of "K" cross-section, and the yoke is suspended from the roof structure of the vault by tie straps secured to the upwardly extending vertical leg and the strongback is supported by tie straps secured to the downwardly extending inclined leg, whilst the downwardly extending vertical leg and upwardly extending inclined leg are secured to the lower and upper strakes respectively of the primary vessel.

DESCRIPTION OF THE DRAWINGS

A construction of liquid metal-cooled fast breeder nuclear reactor of the pool kind embodying the invention is described by way of example with reference to the accompanying drawings wherein.

DESCRIPTION OF THE PREFERRED EBODIMENTS

Figure 1:
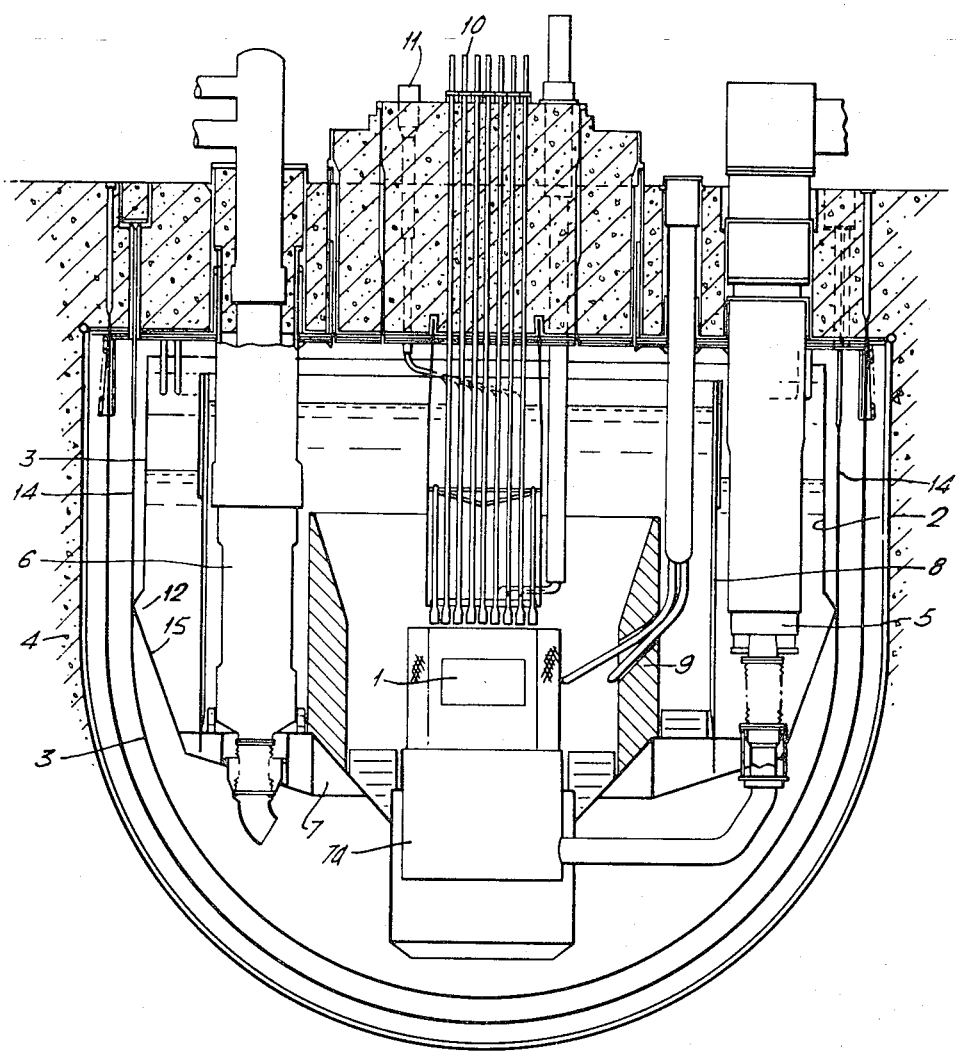
FIG. 1 is a diagrammatic sectional view of the construction.

FIG. 1 illustrates a liquid metal-cooled fast breeder nuclear reactor of the pool kind having a fuel assembly 1 submerged in a pool 2 of liquid sodium coolant in a primary vessel 3. The primary vessel is open at the top and is suspended from the roof of a containment vault 4 and there are provided a plurality of coolant pumps 5 and heat exchangers 6, only one each of the pumps and heat exchangers being shown. The fuel assembly 1, mounted on a diagrid 7a and supported by a strongback 7, is housed with the heat exchangers in an inner tank 8 whilst the pumps 5, which deliver coolant to the diagrid, are disposed outside of the inner tank. The fuel assembly 1 comprises a plurality of sub-assemblies which upstand from the diagrid in closely spaced side-by-side array and the fuel assembly is surrounded by a neutron shield 9. Control rods 10 and instrumentation 11 penetrate the roof of the vault.

In operation of the nuclear reactor, relatively cool coolant drawn from the region of the pool outside of the core tank by the pump 5, is passed upwardly through the fuel assembly in heat exchange therewith by way of the diagrid 7a, thence through the heat exchanger 6 to be discharged back into the outer region of the pool. A secondary coolant is flowed from outside the vault through the heat exchanger in heat exchange with the pool coolant thence to steam generation plant not shown in the drawings.

Figure 2:
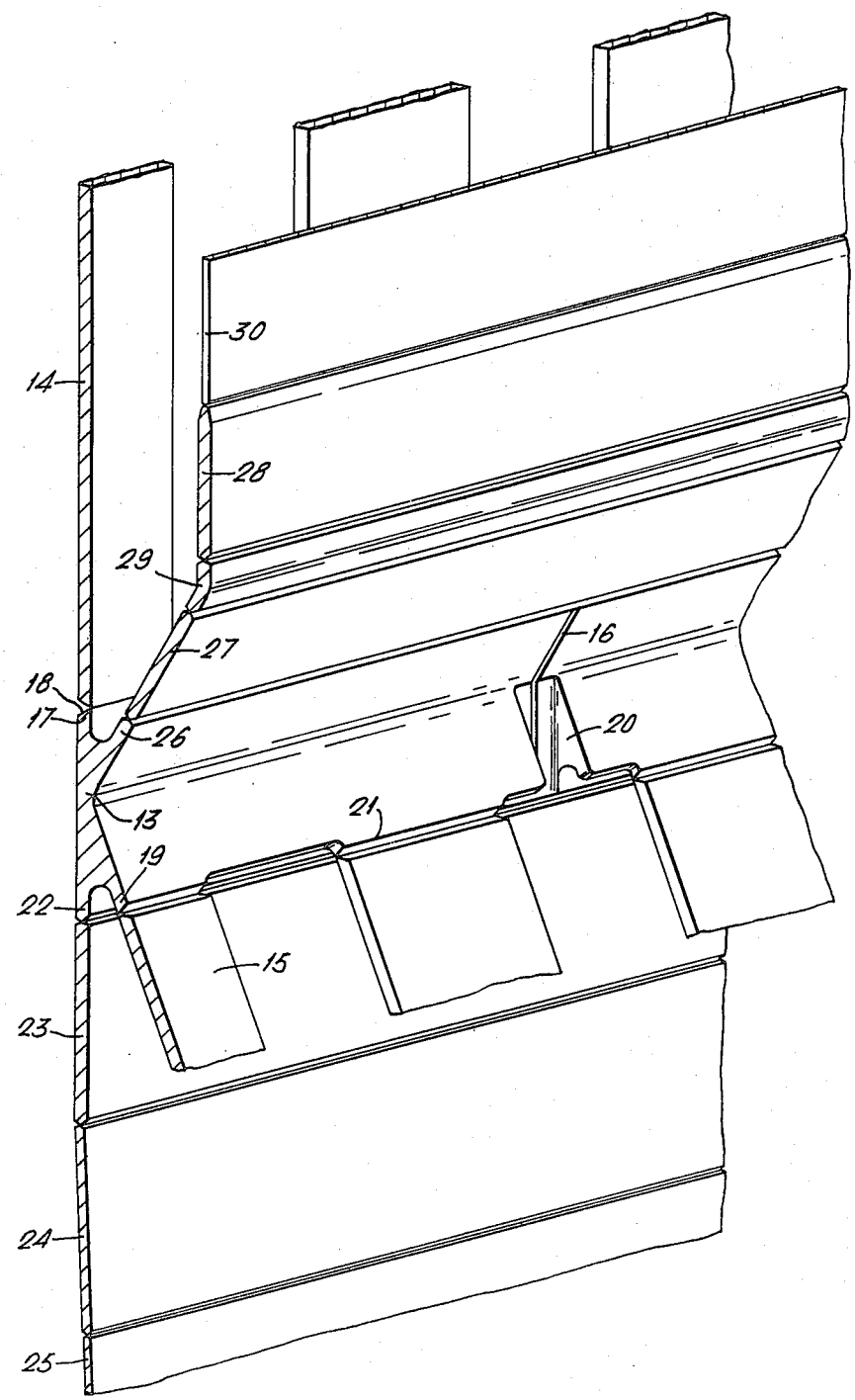
FIG. 2 is a fragmentary view of the inside surface of the primary vessel.
Figure 3:
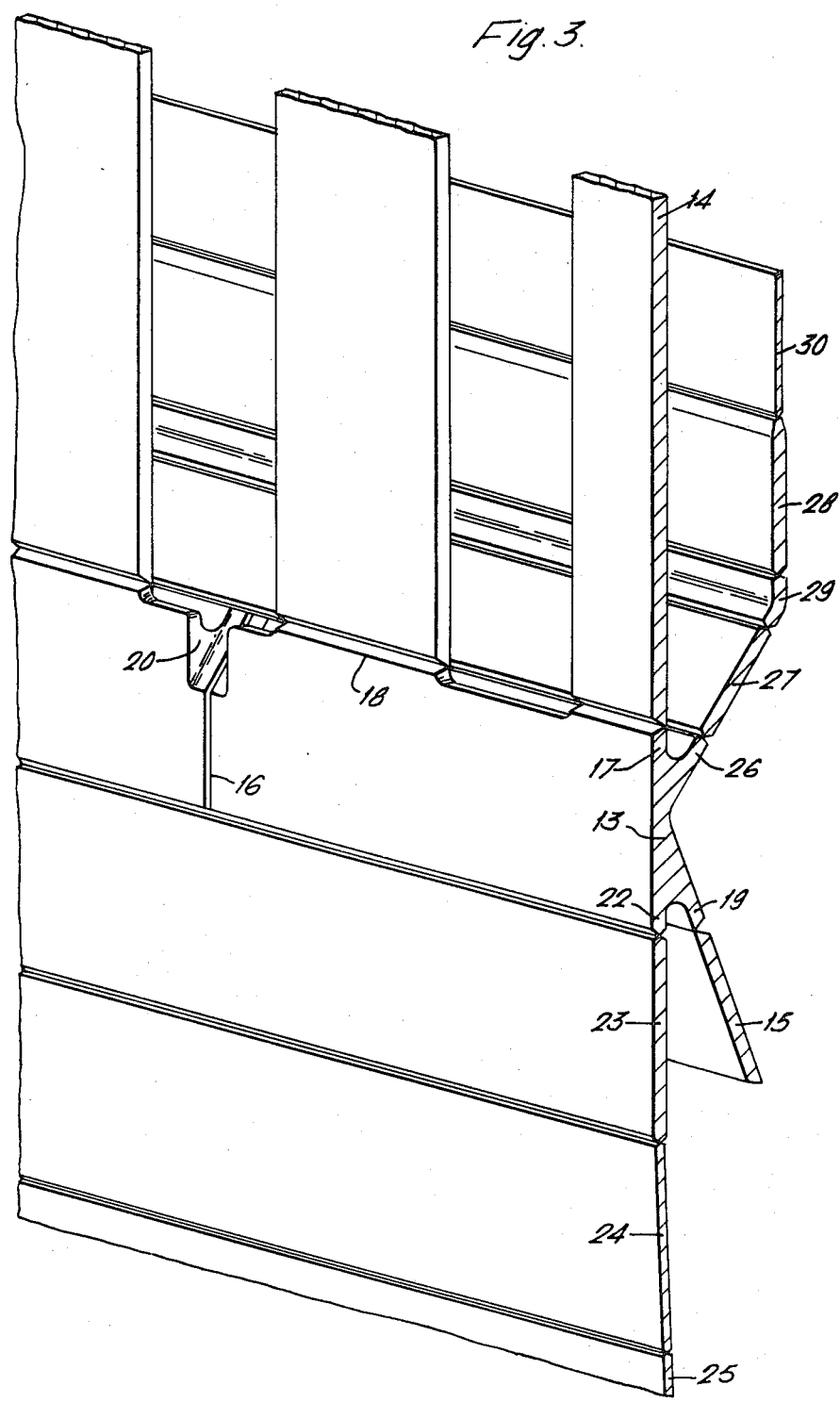
FIG. 3 is a fragmentary view of the outside surface of the primary vessel.

The primary vessel 3 incorporates an annular yoke 12 fabricated from arcuate segments shown in greater detail in FIGS. 2 and 3, the yoke being suspended from the roof structure of the vault by a first annular series of tie straps 14 disposed outside the vessel. The fuel assembly and strongback are supported from the yoke by a second series of tie straps 15. The yoke has upwardly and downwardly extending legs which are extended by upper and lower strakes respectively of the primary vessel. Referring now to FIGS. 2 and 3, the yoke is seen to be farbricated from arcuate segments 13 which are of forged or extruded 'K' sections, the segments being butt welded together end to end as indicated at 16. The upwardly extending vertical leg 17 of the section has a crenellated upper edge 18 the tie straps 14 being butt welded at their ends to the merlons thereof. The downwardly extending inclined leg 19 is crenellated at its lower edge 21, the tie straps 15 being butt welded at their ends to the merlons thereof. The downwardly extending vertical leg 22 of the 'K' section is extended by lower plates 23, 24, of decreasing thickness and extending lengthwise over several segments and to which a hemispherical base region 25 of the primary vessel is attached. The upwardly inclined leg 26 of the 'K' section is extended by plates 27, 28, extending lengthwise over several segments with an intermediate member 29 of angular cross-section, vertically directed upper strakes 30 of the primary vessel being welded to the plate 28. The high load supporting legs 17, 19, are relieved against abutment with the corresponding legs of abutting segments as shown as 20 in FIGS. 2 and 3 in order to reduce the thickness of material to be welded.

In the described construction, the high loading of the fuel assembly and strongback is carried from the roof structure of the vault through the tie straps 14, 15 and the yoke 12. The loading route includes only intermittent weldments such as the end weldments between the tie straps 14, 15 and the legs 17 and 19 of the 'K' section so that in the event of weld crack propagation, the extent of failure is limited to one strap. The remaining primary vessel seam weldments and weldments between yoke and primary vessel strakes, although of continuous nature, being relatively lightly loaded do not constitute critical weld lines.

We claim:

1. A liquid metal cooled fast breeder nuclear reactor construction comprising:

a concrete containment vault, a primary vessel containing a pool of liquid alkali metal coolant housed within the vault, a nuclear fuel assembly support strongback within the primary vessel, and a nuclear fuel assembly submerged in the pool of coolant and supported by the strongback, the primary vessel incorporating a yoke comprised of a plurality of arcuate segments welded end-to-end to form an annular support member, the yoke being suspended from the roof structure of the vault by a first annular series of tie straps disposed outside the primary vessel whilst the strongback is supported from the yoke by a second annular series of tie straps, the yoke having upwardly and downwardly extending legs which are extended by upper and lower strakes respectively of the primary vessel.

2. A nuclear reactor construction according to claim 1 wherein the arcuate segments of the yoke are of "K" cross-section, and the yoke is suspended from the roof structure of the vault by tie straps secured to the upwardly extending vertical leg, the strongback is supported by tie straps secured to the downwardly extending inclined leg, and the downwardly extending vertical leg and upwardly extending inclined leg are secured to the lower and upper strakes respectively of the primary vessel.

3. A nuclear reactor construction according to claim 2 wherein the upper edges of the upwardly extending vertical legs and the lower edges of the downwardly extending inclined legs of the arcuate segments of the yoke are crenellated and the ends of the tie straps are butt welded to the merlons thereof.

4. A nuclear reactor construction according to claim 3 wherein the upwardly extending vertical legs and the downwardly extending inclined legs of the arcuate segments are relieved against abutment with the corresponding legs of abutting segments.

5. A nuclear reactor construction according to claim 4 wherein the arcuate segments of the yoke are forgings.

6. A nuclear reactor construction according to claim 4 wherein the arcuate segments of the yoke are extrusions.

* * * * *